June 29, 1954

J. R. THOMPSON ET AL 2,682,334

CONVEYER APPARATUS

Filed Sept. 23, 1951

Inventors
James R. Thompson
Eugene R. Traxler
By Robert W. Furlong
Atty

Patented June 29, 1954

2,682,334

UNITED STATES PATENT OFFICE 2,682,334

CONVEYER APPARATUS

James R. Thompson, Atlanta, Ga., and Eugene R. Traxler, Stow, Ohio, assignors to The B. F. Goodrich Company, New York, N. Y., a corporation of New York Application March 23, 1951, Serial No. 217,196

4 Claims. (Cl. 198—203)

This invention relates to conveyor apparatus and pertains more particularly to belt-type conveyor apparatus having magnetic intermediate drive units disposed along one or both reaches of the conveying belt to assist in advancing the conveyor belt along a desired path.

It is an object of this invention to provide belt-type conveyor apparatus capable of advancing material along a desired path for an extended distance without transferring the material at intermediate points along the path from one conveyor system to another.

It is also an object of this invention to provide belt-type conveyor apparatus capable of advancing material along a desired path for an extended distance which utilizes a conveying belt of lighter weight construction than may be used in conventional belt-type conveyor apparatus of the same size and capacity.

Still another object of this invention is to provide belt-type conveyor apparatus having a greater efficiency than conventional belt-type conveyor apparatus of the same size and capacity.

It is still another object of this invention to provide belt-type conveyor apparatus having intermediate drive units placed at intervals along the conveying reach and/or the return reach of the belt which are adapted to magnetically attract the conveying belt thereto and advance it along the desired path.

Other objects of this invention will be apparent from the description and drawings which follow.

In the mining industry and various other industries, endless belt-type conveyor systems are frequently employed for conveying bulk material from a convenient loading station to a desired processing station, it often being necessary to convey the material for a distance of several miles. A single conventional belt-type conveyor unit is generally unsatisfactory, since as the length of the conveyor unit increases the conveyor belt must be increased in size to provide a belt which possesses a satisfactory tensile strength to withstand the stresses imposed thereon. However, since the conveyor belt must be flexible for satisfactory operation, the weight and thickness of the conveyor belt can not exceed certain limits and, consequently, conventional endless belt-type conveyor units are limited in length.

It has been necessary, therefore, that conventional conveyor systems for transporting materials over a relatively long distance comprise several independent conveyor units so arranged that each unit conveys the material for a relatively short distance and then transfers the material to another conveyor unit which continues the advance of the material to the next transfer station whereupon the material is transferred to the next conveying unit. This process is repeated until the material is ultimately discharged at the processing station. Conveyor systems of the transfer type as described above have not proven entirely satisfactory, however, in that a quantity of the material being conveyed is frequently "spilled" from the conveyor system as the material is transferred from one conveyor unit to another, considerable maintenance is required to maintain the conveyor system in proper operation, difficulty is encountered in synchronizing all of the numerous conveyor units at a speed necessary to convey the material at a desired constant rate, and excessive wear of the conveying belts occurs because of the impact of the conveyed material on the belt at the transfer point.

We have invented endless belt-type conveyor apparatus which eliminates the limitations and disadvantages enumerated above inherent in conventional belt-type conveyor systems for transporting material for relatively long distances. Apparatus within the purview of this invention may advance the material the entire distance on a single conveyor unit and comprises an endless belt-type conveyor unit which includes intermediate drive units which produce a magnetic field about the conveying belt to magnetically attract the conveying belt thereto and to assist in advancing the belt along the desired path.

To more fully illustrate this invention, one embodiment of the invention is shown and described, however, it will be understood that we do not intend to limit the invention to this embodiment.

Figure 1:
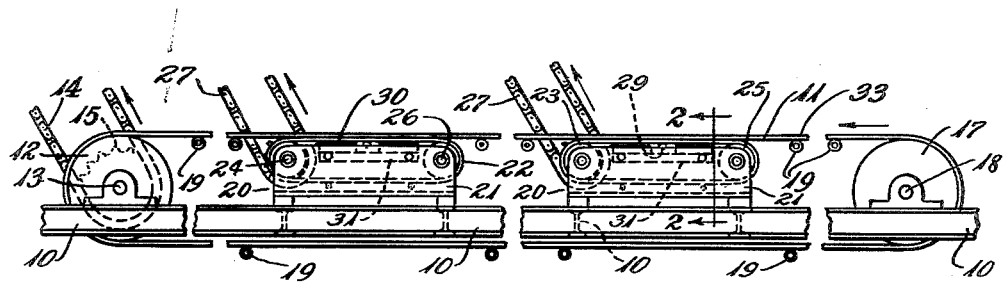
Fig. 1 is a view in side elevation partly broken away of one embodiment of this invention.
Figure 2:
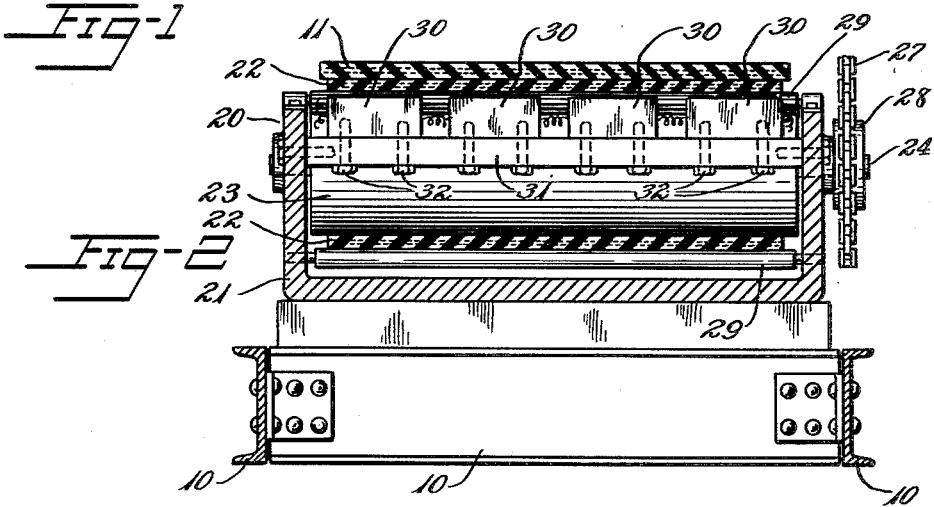
Fig. 2 is a section partly broken away on the line 2—2 of Fig. 1.
Figure 3:
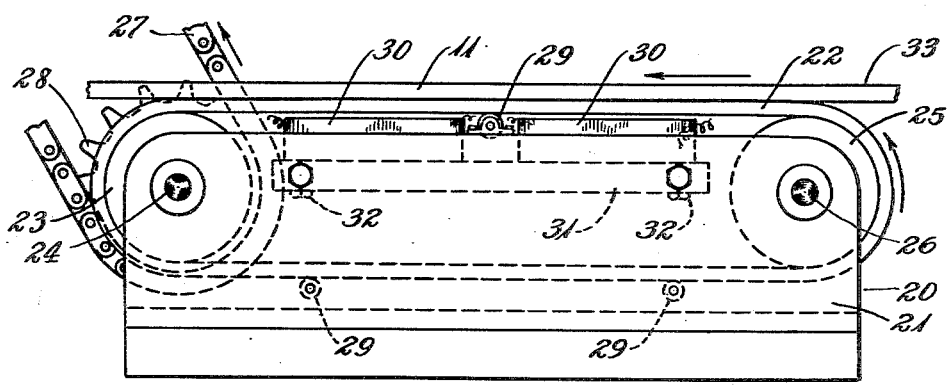
Fig. 3 is a view in side elevation of a selected portion of the embodiment of Fig. 1 showing an intermediate drive unit in engaging relationship with the conveying belt.

Referring to the drawings, the apparatus comprises a main frame 10 which forms a support for various elements of the apparatus. A flexible endless conveyor belt 11 adapted to convey material thereon along a generally linear path travels around idler pulley 17 secured to shaft 18 and around drive pulley 12 which is secured to shaft 13 driven by a multiple speed motor (not shown) through drive chain 14 and sprocket-wheel 15 secured to shaft 13. Belt 11 may be any conventional flexible conveyor belt, preferably a conveyor belt which inherently possesses magnetic properties, such as a sectional steel conveyor belt or a conventional flexible resilient conveyor belt built up of alternating layers or plies of filamentary material, such as textile fabric or longitudinally disposed cords or cables, and a flexible resilient rubbery composition in which one or more or all of the rubbery plies and/or the rubbery belt cover, if a belt cover is desired, have been rendered magnetic by the incorporation therein of an appropriate magnetic material, such as iron dust, magnetite, iron filings, and the like. Idler rollers 19, 19 disposed at frequent intervals along the under side of belt 11 provide support for those portions of the belt disposed between drive pulley 12 and idler pulley 17.

Intermediate drive units 20, 20 disposed at intervals along belt 11, preferably along the under side of upper reach 33 of belt 11, provide additional support for belt 11 and provide additional driving force for advancing belt 11 around drive pulley 12 and idler pulley 17. The interval between successive drive units 20, 20 may vary over a wide range dependent upon the length and size of the conveyor apparatus and upon the quantity of material the apparatus will convey in a unit of time.

Each intermediate drive unit 20 comprises a frame 21 which is rigidly secured to main frame 10 and which provides a support for various elements of drive unit 20. A flexible endless belt 22, such as a sectional metal belt or a conventional flexible resilient drive belt, travels around drive pulley 23 which is secured to shaft 24 and around idler pulley 25 which is secured to shaft 26, and is adapted to engage belt 11 in face-to-face relationship, belt 22 being driven by pulley 23 through shaft 24 which in turn is driven by a multiple speed motor (not shown) through drive chain 27 and sprocket-wheel 28 secured to shaft 24. It is preferable that belt 22 inherently possess magnetic properties and that it comprise alternating layers or plies of a flexible resilient rubbery composition and a filamentary material, such as textile fabric or longitudinally disposed cords or cables. To impart to belt 22 the desired magnetic properties one or more or all of the rubbery plies and/or the rubbery belt cover, if a belt cover is desired, are rendered magnetic by incorporating therein an appropriate finely-divided magnetic material, such as iron dust, iron filings, magnetite, or the like. Idler rollers 29, 29 disposed along the under side of belt 22 at frequent intervals provide support for those portions of belt 22 disposed between drive pulley 23 and idler pulley 25. Electromagnets 30, 30 disposed between drive pulley 23 and idler pulley 25 and between the reaches of belt 22 are secured to support 31 by bolts 32, 32 and when energized attract belt 11 and belt 22 thereto.

In the operation of the conveyor apparatus electromagnets 30, 30 of each supplemental drive unit 20 are energized causing a magnetic field to be produced about those portions of belt 11 and belt 22 which are in face-to-face contacting relationship and, consequently, causes a material possessing magnetic properties situated within the confines of the magnetic field to be attracted thereto. For instance, if the conveyor system is conveying a material which inherently possesses magnetic properties, the material will be attracted toward electromagnets 30, 30 as the material passes through the magnetic field produced by electromagnets 30, 30, or, if belt 11 is inherently magnetic, it will be attracted toward electromagnets 30, 30 in the same manner. It is apparent that, as the material being conveyed and/or belt 11 are attracted toward electromagnets 30, 30, belt 11 will be urged against belt 22 and firmly held thereto increasing the thrust of belt 11 against belt 22 and, consequently, increasing the maximum static friction and the force required to cause slippage between belt 11 and belt 22. As a result of the greatly increased resistance to slippage between belt 11 and belt 22, as belt 22 is advanced, that portion of belt 11 firmly held thereto will be advanced, thereby advancing belt 11 around pulley 12 and idler pulley 17 supplementing the driving action of drive pulley 12 in advancing belt 11 about pulley 12 and pulley 17.

Apparatus within the purview of this invention is particularly adapted for efficiently conveying bulk material, such as coal and ores, over relatively long distances, often a distance of several miles, without the attendant loss of material which generally occurs in conveying bulk material on conventional transfer conveyor apparatus.

The conveyor apparatus herein described may utilize conveying belt of lighter weight construction than a conventional single unit conveyor system of equal length and capacity because in our conveyor apparatus the intermediate drive units in supporting and assisting to advance the conveying belt around its drive and idler pulleys reduce the tensile forces in the belt, which forces are a major factor in determining the minimum weight and size of belt that can be utilized on any conveyor apparatus.

While the invention has been described with particular reference to one embodiment of the invention, it is clear that obvious variations and modifications are possible without departing from the spirit and scope of the invention as defined in the appended claims.

We claim:

1. Conveyors apparatus comprising a flexible resilient endless belt-type conveyor belt, said belt being disposed around spaced-apart pulleys, and a belt-type drive unit disposed between said spaced-apart pulleys and between the opposing reaches of said conveyor belt and adapted to contact and advance said conveyor belt by frictional engagement therewith, said drive unit comprising a flexible resilient endless belt-type drive belt disposed around spaced-apart pulleys, the outer face of said drive belt being disposed in face-to-face engaging relationship with said conveyor belt with the opposing faces of said drive belt and conveyor belt engaging each other throughout their entire extent, means for advancing said drive belt around said spaced-apart pulleys of said drive unit, and magnetic means capable of producing a magnetic field about said conveyor belt disposed between said spaced-apart pulleys of said drive unit and between the opposing reaches of said drive belt to magnetically attract said conveyor belt to said drive belt.

2. Conveyor apparatus comprising a flexible resilient endless-belt-type conveyor belt, said belt being magnetic and comprised of alternating layers of textile filamentary reinforcing material and rubber, said belt being disposed around spaced-apart pulleys, and a belt-type drive unit disposed between said spaced-apart pulleys and between the opposing reaches of said conveyor belt and adapted to contact and advance said conveyor belt by frictional engagement therewith, said drive unit comprising a flexible resilient endless belt-type drive belt disposed around spaced-apart pulleys, said drive belt being comprised of alternating layers of textile filamentary reinforcing material and rubber, the outer face of said drive belt being disposed in face-to-face engaging relationship with said conveyor belt with the opposing faces of said drive belt and conveyor belt engaging each other throughout their entire extent, means for advancing said drive belt around said spaced-apart pulleys of said drive unit, and magnetic means capable of producing a magnetic field about said conveyor belt disposed between said spaced-apart pulleys of said drive unit and between the opposing reaches of said drive belt to magnetically attract said conveyor belt to said drive belt.

3. Conveyor apparatus comprising a flexible resilient endless belt-type conveyor belt, said belt being magnetic and comprised of alternating layers of textile filamentary reinforcing material and rubber, said belt being disposed around spaced-apart pulleys, and a belt-type drive unit disposed between said spaced-apart pulleys and between the opposing reaches of said conveyor belt and adapted to contact and advance said conveyor belt by frictional engagement therewith, said drive unit comprising a flexible resilient endless belt-type drive belt disposed around spaced-apart pulleys, said drive belt being magnetic and comprised of alternating layers of textile filamentary reinforcing material and rubber, the outer face of said drive belt being disposed in face-to-face engaging relationship with said conveyor belt with the opposing faces of said drive belt and conveyor belt engaging each other throughout their entire extent, means for advancing said drive belt around said spaced-apart pulleys of said drive unit, and magnetic means capable of producing a magnetic field about said conveyor belt disposed between said spaced-apart pulleys of said drive unit and between the opposing reaches of said drive belt to magnetically attract said conveyor belt to said drive belt.

4. Conveyor apparatus comprising a drive pulley, an idler pulley spaced-apart from said drive pulley, a flexible resilient endless belt-type conveyor belt disposed around said drive pulley and said idler pulley, said belt being magnetic and comprised of alternating layers of textile filamentary reinforcing material and rubber, means for revolving said drive pulley about its longitudinal axis to advance said conveyor belt around said drive pulley and said idler pulley, and a supplemental belt-type drive unit disposed between said drive pulley and said idler pulley and between the opposing reaches of said conveyor belt and adapted to contact and advance said conveyor belt around said drive pulley and said idler pulley, said drive unit comprising a drive pulley, an idler pulley spaced-apart from said drive pulley, a flexible resilient endless belt-type drive belt comprised of alternating layers of textile filamentary reinforcing material and rubber disposed around said drive pulley and said idler pulley of said drive unit, the outer face of said drive belt being disposed in face-to-face engagement relationship with said conveyor belt with the opposing faces of said drive belt and conveyor belt engaging each other throughout their extent, means for revolving said drive pulley of said drive unit about its longitudinal axis to advance said drive belt around said drive pulley and said idler pulley of said drive unit, and magnetic means adapted to produce a magnetic field about said conveyor belt disposed between said drive pulley and idler pulley of said drive unit and between the opposing reaches of said drive belt to magnetically attract said conveyor belt to said drive belt.

References Cited in the file of this patent

UNITED STATES PATENTS

| Number | Name | Date |
|---|---|---|
| 804,474 | Hoy | Nov. 14, 1905 |
| 1,071,847 | Wilson | Sept. 2, 1913 |
| 1,561,063 | Dunlap | Nov. 10, 1925 |
| 2,594,342 | Pettyjohn | Apr. 29, 1952 |